(12) United States Patent
Kirilenko et al.

(10) Patent No.: US 10,162,407 B2
(45) Date of Patent: Dec. 25, 2018

(54) ARM BAND SENSOR AND METHOD FOR OPERATING AN ARM BAND SENSOR (71) Applicant: ZF Friedrichshafen AG, Friedrichshafen (DE)

(72) Inventors: Alexander Kirilenko, Diepholz (DE); Vitali Fribus, Quakenbrück (DE); Karsten Straßburg, Hannover (DE)

(73) Assignee: ZF Friedrichshafen AG, Friedrichshafen (DE)

(*) Notice: Subject to any disclaimer, the term of this patent is extended or adjusted under 35 U.S.C. 154(b) by 81 days.

(21) Appl. No.: 15/105,274

(22) PCT Filed: Nov. 19, 2014

(86) PCT No.: PCT/EP2014/074960
§ 371 (c)(1),
(2) Date: Jun. 16, 2016

(87) PCT Pub. No.: WO2015/090810
PCT Pub. Date: Jun. 25, 2015

(65) Prior Publication Data
US 2016/0313791 A1 Oct. 27, 2016

(30) Foreign Application Priority Data
Dec. 19, 2013 (DE) .................. 10 2013 226 682

(51) Int. Cl.
*G06F 3/041* (2006.01)
*G06F 3/01* (2006.01)

(52) U.S. Cl.
CPC .............. *G06F 3/011* (2013.01); *G06F 3/016* (2013.01); *G06F 3/017* (2013.01)

(58) Field of Classification Search
CPC combination set(s) only.
See application file for complete search history.

(56) References Cited

U.S. PATENT DOCUMENTS

2013/0155237 A1 6/2013 Paek et al.
2013/0265229 A1 10/2013 Forutanpour et al.

FOREIGN PATENT DOCUMENTS

DE 10 2004 038 965 A1 3/2005
DE 602 15 504 T2 9/2007

OTHER PUBLICATIONS

International Search Report and Written Opinion of the International Search Authority dated Apr. 10, 2015 in International Application No. PCT/EP2014/074960 (English and German languages) (11 pp.).
German Search Report dated Aug. 12, 2014 for German Patent Application No. 10 2013 226 682.0 (German language with two-page English explanations) (10 pp.).

*Primary Examiner* — Van N Chow
(74) *Attorney, Agent, or Firm* — Brinks Gilson & Lione (57) ABSTRACT

The present disclosure provides an arm band sensor comprising an arm band with a hand sensor and a transmitter unit. The hand sensor may be configured to acquire a condition and/or a position of the hand in relation to the arm in order to provide a hand signal. A transmitter unit may be configured to transmit the hand signal in wireless fashion.

18 Claims, 4 Drawing Sheets

ARM BAND SENSOR AND METHOD FOR OPERATING AN ARM BAND SENSOR

This application is a filing under 35 U.S.C. § 371 of International Patent Application PCT/EP2014/074960, filed Nov. 19, 2014, and claims the priority of German Patent Application 10 2013 226 682.0, filed Dec. 19, 2013. These applications are incorporated by reference herein in their entireties.

TECHNICAL FIELD

The present disclosure relates to an arm band sensor, a method for operating an arm band sensor, an evaluation unit and a method for operating an evaluation unit.

BACKGROUND

In the field of human-machine-interfaces (HMI) the demands are growing. Especially in the field of driver assistance systems for a motor vehicle, communication between human and machine should be simple, efficient and safe. In this regard, it is especially relevant that the input performed by a human, especially the driver of the vehicle, are clearly and correctly recognized also by the human-machine-interface (HMI), in order to avoid malfunctions when operating the motor vehicle. In the worst case, such malfunctions could endanger the traffic safety, the health and life of the car passengers or any other road users.

The present disclosure relates to an arm band sensor, a method for operating an arm band sensor, an evaluation unit and a method for operating an evaluation unit.

In the field of human-machine-interfaces (HMI) the demands are growing. Especially in the field of driver assistance systems for a motor vehicle, communication between human and machine should be simple, efficient and safe. In this regard, it is especially relevant that the input performed by a human, especially the driver of the vehicle, are clearly and correctly recognized also by the human-machine-interface (HMI), in order to avoid malfunctions when operating the motor vehicle. In the worst case, such malfunctions could endanger the traffic safety, the health and life of the car passengers or any other road users.

In this context, the publication DE 10 2004 038 965 A1 discloses a hand image switching device.

Against this background, the present disclosure provides an improved possibility for the communication between a human and a machine, especially by using an arm band sensor, a method for operating an arm band sensor, as well as an evaluation unit and a method for operating an evaluation unit. Advantageous embodiments are included in the subsequent description.

BRIEF SUMMARY

The approach of the present disclosure provides an arm band sensor, which is characterized by the fact that the arm band sensor has an arm band with a hand sensor and transmitter unit, wherein the hand sensor is designed to acquire a condition and/or position in relation to an arm in order to provide a hand signal, and wherein the transmitter unit is designed to transmit the hand signal, especially in wireless fashion.

For example, the arm band can involve a flexible or expansive element, which can be attached to an arm, wrist or hand of a person, for example, a driver of a motor vehicle. For example, the arm band can enclose the respective body part or simply be attached to a part of the respective body part, for example, by means of an adhesive or in combination with an attachment on an article of clothing of the respective person. For example, the arm band can be attached on a cuff of the person's shirt. A hand sensor can involve a sensor, which is able to acquire a condition, a motion sequence and/or a position of the hand in relation to the arm or an individual part of the hand and to provide information related to the acquired condition and/or acquired position in the form of a hand signal. In particular, it is also possible to acquire parts of the hand, for example, individual fingers in relation to one another and in relation to the arm in its condition or position or a motion sequence, for example, to be able to acquire a gesture of the hand in its entirety. A transmitter unit can involve an electrical or electronic component, which is coupled with the hand sensor to pick up the hand signal and continue to be in the position of transmitting the hand signal to a device placed externally on the arm band sensor. In particular, the transmitter unit can have a radio interface to transmit the hand signal in wireless fashion in the form of a radio signal.

The proposed approach is based on the knowledge that the simple recognition of a condition and/or position of the hand or a gesture of the hand can be performed by means of a sensor, which is located in the immediate spatial range of the hand. In this way, it can be avoided that an error-prone interpretation of a movement of the hand can be made because of a technically complex evaluation of images and a respective distinction of the hand against the background. Instead, by means of the hand sensor, which is attached together with the arm band, for example, at the wrist or arm of the person, it is possible to acquire the condition and/or position of the hand very reliably and largely free of interferences. At the same time, with the use of the arm band sensor, the proposed approach allows for a cost-effective and technically simple possibility of acquiring the condition and/or position of the hand in relation to the arm. In this way, the proposed approach can be rapidly used in a mass market, such as automobile technology.

Very advantageous is an embodiment of the present disclosure in which the hand sensor is designed in the form of a current sensor and/or tension sensor in order to acquire a muscle current and/or muscle tension in a movement of the hand and/or arm and to provide the hand signal in response to the acquired muscle current and/or the acquired muscle tension. Such an embodiment of the present disclosure has the advantage that as a result of the evaluation of a muscle current or muscle tension the movements of the hand can be very reliably reproduced or interpreted. For this purpose, it is possible to use technically very simply designed, reliable and cost-effective sensors, for developing the hand sensor.

According to a further embodiment of the present disclosure, the hand sensor can be designed in the form of a pressure sensor, acceleration sensor and/or motion sensor in order to acquire a movement, position, conditions and/or change of condition of the hand and to provide the hand signal in response to the acquired movement, position, condition and/or change of condition of the hand. Alternatively or additionally, the hand sensor can be designed in the form of an optical sensor in order to acquire a movement, position, condition and/or change of condition of the hand and to provide the hand signal in response to the acquired movement, position, condition and/or change of condition of the hand. Such an embodiment of the present disclosure has the advantage that the movements, position, condition and/or change of condition of the hand can occur even independently from a current and/or tension measurement, for example, in order to avoid measurement interferences when measuring the muscle current and/or the muscle tension, which can result from a moist skin surface. At the same time, it is possible to make a very reliable and clear statement regarding the movement of the hand by using and evaluating different physical parameters for determining the movements, position, condition or change of condition of the hand.

One embodiment of the present disclosure operates especially reliable in that the hand sensor is designed to be able to distinguish a first gesture performed by the hand from a second gesture performed by the hand, wherein the hand sensor is also designed to provide information about the first and/or second gesture in the hand signal. In the present case, a gesture can involve a motion sequence of the hand or of individual components or the hand, for example, the fingers, or a static structure of the hand in relation to the arm or individual parts of the hand in relation to one another or in relation to the arm. Such an embodiment of the present disclosure has the advantage that it is possible to quickly evaluate and interpret the movement of the hand only by distinguishing different gestures in the arm band sensor and at the same time it is possible to reduce data volume to be transmitted from the transmitter unit in the hand signal.

To avoid that the movement of the hand is misinterpreted by the human-machine-interface, another embodiment of the present disclosure provides at least one locating unit, which is designed to receive at least one locating signal, especially one representing a position of the hand in relation to a reference unit. At the same time, the hand sensor can be designed to acquire the condition and/or position of the hand in response to a received locating signal. Additionally or alternatively, the transmitter unit can be designed to transmit the hand signal in response to a received locating signal. For example, a locating signal can involve a signal of a reference unit which has the purpose, or which is used to determine a position of the arm band sensor in relation to the reference unit. For example, such a determination of the position of the arm band sensor in relation to the reference unit can be performed by evaluating the signal strength, phase or frequency of the locating signal, especially when more than one locating signal has been transmitted by one or multiple reference units, which are respectively divided in a signal strength, phase or frequency. Such an embodiment of the present disclosure has the advantage that an evaluation of the movement and/or condition of the hand can occur, for example, merely in a spatial monitoring area so that a person outside of the monitoring area can make any movement with his hand without running the risk that the movement of the hand is interpreted as an evaluation-relevant gesture. This clearly increases the chance that a user, for example, the driver of a vehicle, would accept the proposed approach. At the same time, the error rate is reduced and the traffic safety of a vehicle is increased, when undesired interpretations of a movement and/or condition of the hand are not performed.

Furthermore, to ensure that the human-machine-interface performs an interpretation of the condition and/or movement of the hand only in actively desired situations, the hand sensor in another embodiment of the present disclosure can also be designed to acquire the condition and/or position of the hand when (for example, following a received locating signal) an activation gesture of the hand was recognized. Alternatively or additionally, the transmitter unit can be designed to transmit the hand signal when (for example, following a received locating signal) an activation gesture of the hand was recognized. For example, an activation gesture can involve a predefined motion sequence of the hand. When the hand sensor recognizes the predefined motion sequence of the hand, this can be interpreted as performance of a respective activation gesture, so that a subsequent movement and/or condition of the hand can be acquired and interpreted and subsequently a respective information can be provided in the hand signal or a respective hand signal can be transmitted by means of the transmitter unit.

According to a further embodiment of the present disclosure, a feedback unit with a receiving unit can be provided to give a user of the arm band sensor a feedback regarding the recognized condition and/or movement of the hand, wherein the feedback unit is designed to output a haptic, optic and/or acoustic user signal for the user of the arm band sensor in response to the feedback signal received from the receiving unit. In particular, the feedback unit can be designed to output a respectively different haptic, optic and/or acoustic user signal for the different feedback signals received in the receiving unit. For example, such a feedback signal can involve a vibration for the haptic signal, a flashing light for the optic signal and/or a beep signal for the acoustic signal.

One embodiment of the present disclosure can also advantageously be used as a method for operating an arm band sensor, characterized in that the method comprises the following steps:

Acquiring the condition and/or position of the hand in relation to the arm in order to provide the hand signal; and Transmitting the hand signal, especially transmitting the hand signal in wireless fashion, to operate the arm band sensor.

With such an embodiment of the present disclosure, it is also possible to implement the advantages of the present disclosure in an efficient and cost-effective manner.

Furthermore, it is possible to use an embodiment of the present disclosure as an evaluation unit for evaluating a hand signal provided by one version of the arm band sensor of the present disclosure, characterized in that the evaluation unit is designed to activate an element of a vehicle, in particular a transmission, in response to a hand signal received from the transmitter unit of the arm band sensor. Such an embodiment of the present disclosure has the advantage of providing an especially reliable, comfortable and technically simple possibility for activating the element of a vehicle even without any contact.

Furthermore, one embodiment of the present disclosure has the advantage of comprising at least one reference unit, which is designed to transmit at least one locating signal, wherein the locating signal is especially designed to determine a position of the reference unit from at least one parameter. Such an embodiment of the present disclosure has the advantage that based on the provision of the reference unit it is possible to supply an evaluation space in which the condition, movements and/or gestures of the hand are actually evaluated by the human-machine-interface system. In this way, the evaluation of movements or conditions of the hand can be restricted to a specific spatial evaluation range so that the user of the proposed approach experiences a higher operating comfort because an evaluation of unintentional gestures and a resulting faulty operation of the element of the vehicle is avoided or at least reduced.

One embodiment of the present disclosure is especially easy and comfortable for the user of the proposed approach because it provides a display unit which is designed to output, respectively, an optic, acoustic and/or haptic display signal corresponding to the hand signal received by the user of the arm band. For example, such a display signal can also be represented by a flashing light, a beep signal or a vibration, for example, on the steering wheel. In this way, it is easy for the user of the arm band sensor to determine which condition, movement and/or gesture the human-machine evaluation system has recognized from his hand movement and to make quickly a respective correction movement in the event of an incorrect interpretation in order to avoid or reverse the faulty operation of the element of the vehicle.

One embodiment of the present disclosure has the advantage that it has a feedback signal output unit, which is designed to output a feedback signal corresponding to the received hand signal. For example, such a feedback signal can include information as to which position, condition and/or movement of the hand has been recognized or read by the evaluation unit. The feedback signal can then be used, for example, by a respective feedback unit in the arm band sensor to output a respective optic, acoustic or haptic signal to the user of the arm band sensor. In this way, the user of the arm band sensor can easily recognize transmission errors between the transmitter unit and the receiving unit.

Furthermore, one embodiment of the present disclosure can also be used advantageously as a method for operating an evaluation unit according to a version of the present disclosure, which is characterized by the following steps:

Reception of the hand signal by the arm band sensor; and

Activation of the element of the vehicle, especially the transmission, in response to the hand signal received by the transmitter unit of the arm band sensor.

With such an embodiment of the present disclosure, it is also possible to implement the advantages of the approach of the present disclosure in a cost-effective and technically simple manner.

In the present case, a sensor, equipment or a unit can involve an electrical device, which processes physical parameters or electrical signals, for example, sensor signals, and outputs control or data signals on this basis. The equipment or unit can have one or multiple interface/s, which can be designed in the form of hardware and/or software. For example, in a hardware design, the at least one interface can be part of an integrated circuit, in which functions of the equipment are implemented. The at least one interface can comprise a specific integrated or consist at least partially of discrete components. In a software design, the at least one interface can comprise a software module, which is available, for example, on a microcontroller in addition to other software modules.

Advantageous is also a computer program product with a program code, which can be stored on a machine-readable media, such as a semiconductor memory, hard drive memory or optic memory and used for performing the method according to one of the embodiments described above, when the program is executed on a computer or device. Consequently, the present disclosure proposes a computer program that has been set up for performing and/or controlling all steps of one of the methods or versions of the present disclosure. The approach of the present disclosure provides also a machine-readable storage medium with a computer program of the type disclosed above.

BRIEF DESCRIPTION OF THE DRAWINGS

Subsequently, the present disclosure is described in an exemplary manner by means of the enclosed drawings. It is shown.

DETAILED DESCRIPTION

In the subsequent description of preferred embodiments of the present disclosure, the same or similar reference numerals are used for elements shown in the different figures and having similar functions, wherein the description of these elements is not repeated.

Figure 1:
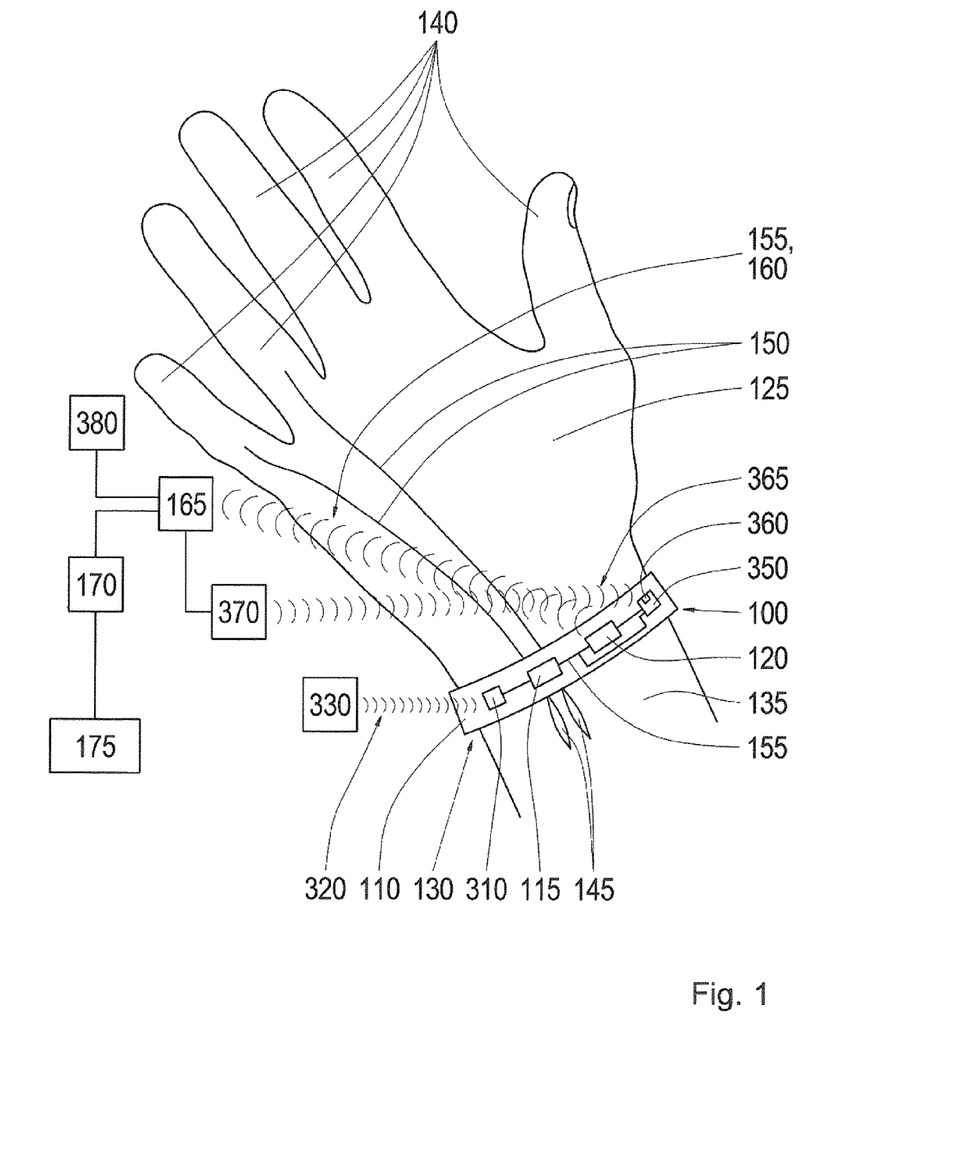
FIG. 1 a block diagram of an arm band sensor according to an embodiment of the present disclosure used with an embodiment of the present disclosure in the form of an evaluation unit.

FIG. 1 shows a block diagram of an arm band sensor 100 according to an embodiment of the present disclosure. The arm band sensor 100 has an arm band 110, a hand sensor 115 and a transmitter unit 120. As shown in FIG. 1, the arm band 110 is designed, for example, in the form of a flexible band and can be pushed over the 125 on to the wrist 130 or arm 135. Alternatively or additionally, the arm band 110 can be designed, for example, in the form of a simple strip provided with an adhesive film (not shown in FIG. 1) on the rear side of the arm band 110 in order to attach the arm band 110 on the arm 135 or wrist 130. The arm band 110 is to be used as carrier medium for the hand sensor 115 and the transmitter unit 120, which means that the hand sensor 115 and the transmitter unit 120 are attached on the arm band 110.

The hand sensor 115 is designed to acquire a condition and/or position of the hand 125 or parts of the hand, such as the individual fingers 140 in relation to one another or in relation to the arm 135. The hand sensor 115 is also able to acquire a motion sequence and/or change of condition of the hand 125 or parts of the hand 140. At the same time, the hand sensor 115 can recognize the condition, position or movement of the hand 125 or parts of the hand by evaluating different parameters. One possibility of acquiring the condition or position of the hand 125 comprises that the hand sensor 115 determines tensions or currents of the muscles 145 (shown in a diagram in FIG. 1), which are in the wrist 130 or arm 135 and which move the hand 125 or parts of the hand 140. For this purpose, it is possible to make use of the anatomical feature that most of the muscles 145 required for moving the hand 125 are not located directly in the hand 125 but in the arm 135 and are connected by means of tendons 150 with the parts of the hand 125 to be moved, for example, the fingers 140. As a result, the muscles are prompted to contract by being stimulated with an activation signal or activation tension, wherein the activation tension or activation potential can be acquired, for example, in capacitive or inductive manner or by means of the resistance measurement on the skin in the area of the arm band sensor 100.

Alternatively or additionally, the condition and/or movement of the hand 125 or parts 140 of the hand can also be acquired with measurements of other physical parameters. For example, the hand sensor 115 can be designed in the form of a pressure and/or acceleration sensor, which recognizes a movement of the tendons 150 in the wrist 130 when the muscles 145 are contracting. Based on the anatomical knowledge of how the respective tendons 150 are positioned for moving the individual fingers 140, it is possible to draw conclusions with regard to the actually performed movement of the hand 125 or the condition and/or position of different parts of the hand 125. In addition, an optical recognition of the area of the hand 125 can also be performed from the hand sensor 115, thus making it possible to determine the condition and/or position of the hand 125 or different parts of the hand 140 in relation to the arm 135 or wrist 130.

The condition, movement and/or position of the hand 125 or parts of the hand determined by the hand sensor 115 is then transmitted as hand signal 155 to the transmitter unit 120. Then, the transmitter unit 120 transmits the hand signal 155 or transmission signal 160 corresponding to the hand signal 155, which is received and evaluated by an evaluation unit 165. For example, the evaluation unit 165 can comprise a control unit 170 for a transmission 175 of a vehicle. In this way, it is possible to activate the transmission 175 through manual movements, for example, to perform a gear selection in the transmission 175 manually.

Therefore, in a motor vehicle, the approach of the present disclosure can be used with a selection and control unit 170 for selecting the transmission speed levels. At the same time, the gear range selection is performed by means of the arm band sensor 100, which recognizes different muscle stresses of the hand 125 (and in this way initiates a gesture control of the gear selection) and transmits them in the form of a signal 155 or 160 to a respective receiver 165 for evaluation. An important aspect of the approach of the present disclosure is the selection of transmission speed levels by means of an arm band, which measures the electrical currents or tensions of the muscles 145 of the hand 125 or arm 135 and transmits them wirelessly in the form of a signal 155 or 160 to a receiver 165. Subsequently, the signals 155 or 160 are evaluated by the receiver 165 and assigned to an interaction (for example, shift forward). In the process, different gestures can be recognized in the hand sensor 115 or evaluation unit 165, as represented in the chart shown in FIG. 2. For example, it is possible to train gestures for forward travel (forward travel gesture 210 corresponding to the representation on the top line of the chart shown in FIG. 2), for driving in reverse (reverse gesture 220 corresponding to the representation on row two from the top of the chart shown in FIG. 2), the release or neutral mode (release gesture 230 corresponding to the representation on row three from the top of the chart shown in FIG. 2) or the parking position (parking position gesture 240 corresponding to the representation on the bottom line of the chart shown in FIG. 2) in in the human-machine-communication system (HMI) consisting of arm band sensor 100 and associated evaluation unit 165, making it possible to clearly identify and recognize, for example, in the hand sensor 115 and/or the evaluation unit 165, the respective gestures based on the condition or position of the hand 125 or parts of the hand 140 in relation to one another or to the arm 135. In the representation shown in FIG. 2, the individual gestures in the different columns of each line are depicted from different points of view.

Figure 2:
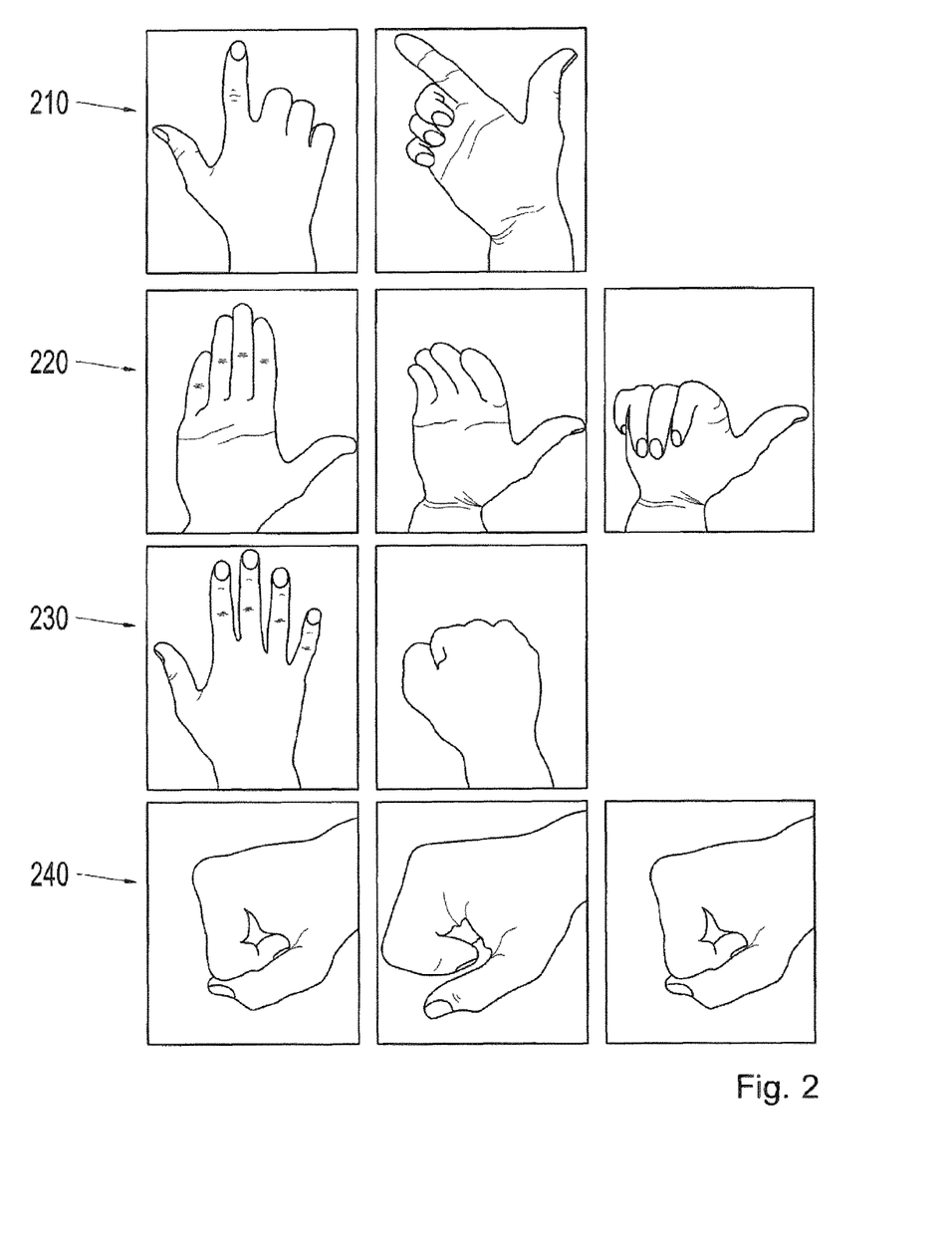
FIG. 2 a chart with different perspective views of different gestures, which can be recognized by the arm band sensor or hand sensor or by the evaluation unit.

The gestures of the driver should be specifically trained for making it possible to clearly distinguish a first gesture 210 for shifting the transmission 175 in forward travel from a second gesture 220 for shifting the transmission 175 in reverse. The different gestures for the interaction are predetermined. Each gesture can be clearly identified and assigned to an interaction.

According to different versions of the present disclosure, the following precautions are taken to avoid that the driver interacts unintentionally with the evaluation unit 165.

For example, according to the representation shown in FIG. 1, it is possible to provide position-dependent interaction by equipping the arm band 110 with a position sensor, for example, a locating unit 310. This locating unit 310 is designed to receive and evaluate at least one locating signal 320 (for example, in the form of an antenna), which is transmitted by at least one reference unit 330. For example, the reference unit 330 is located (as a single unit or in multiple parts) in the interior of the vehicle 335 (for example, in the area of the vehicle console 345) and transmits the locating signal 320 in such a way that the locating unit 310 recognizes, for example, from the signal strength of the locating signal 320, a phase, a frequency and/or a transmitting direction of the locating signal 320 that the arm band sensor 100 is located in a "command range" 340, wherein interaction or recognition of the gesture, hand condition and/or hand position is allowed only in this "command range" 340. Outside of the "command range" 340, as shown, for example, in FIG. 3 as a spatial range in front of the center console 345, a recognition of hand movements of the driver are undesired, because in this way unintentional hand movements of the driver could be misinterpreted as instructions for activating the transmission 175. This would considerably reduce the acceptability of the approach of the present disclosure. For this purpose, fixed antennas 330 used as reference units are mounted in a specific area, like with "Keyless-Go". When the arm band sensor 100 approaches or enters this area 345, an interaction is activated and the driver can control the transmission speed level by means of gesture.

Figure 3:
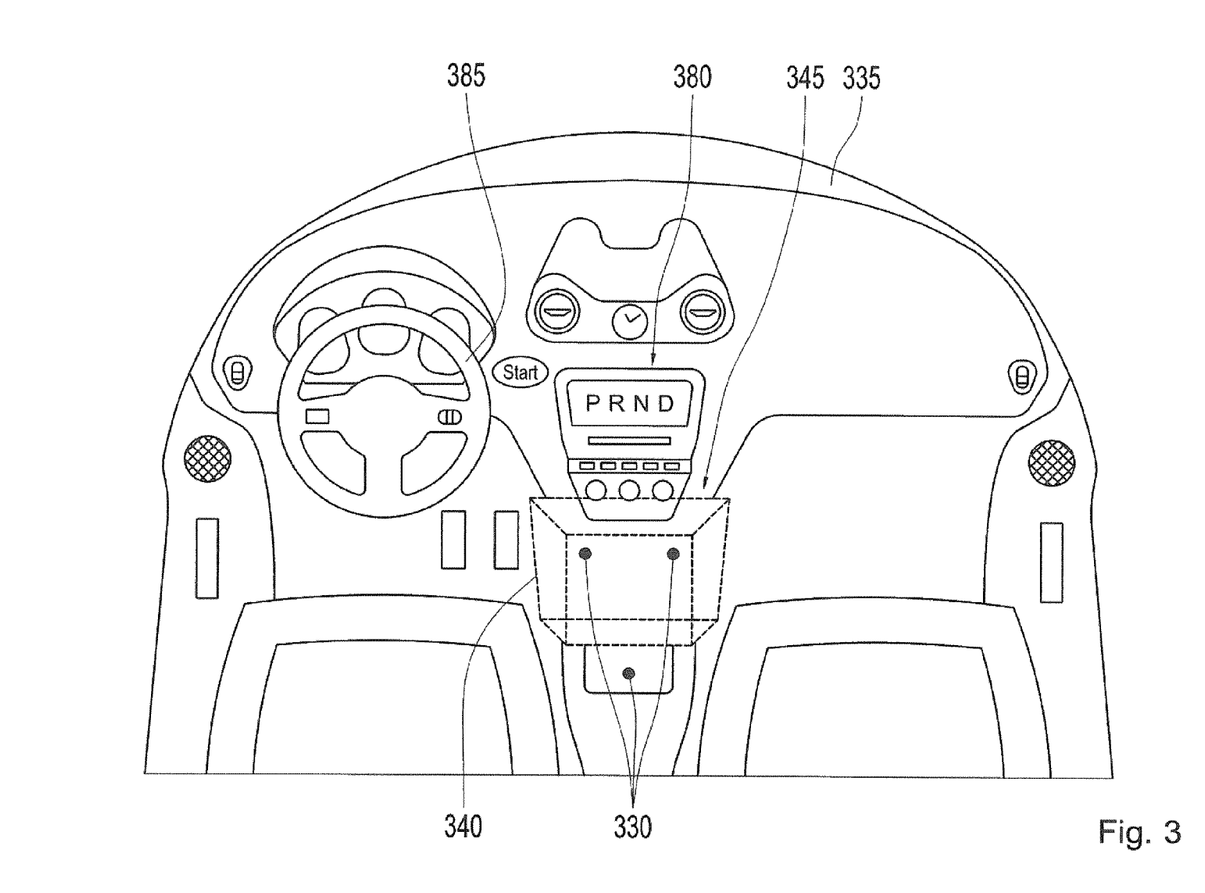
FIG. 3 a representation of a dashboard of a vehicle, which shows an assembly of different components of embodiments of the present disclosure.

According to a further embodiment, the arm band sensor 100 can have also a feedback unit 350. For example, the feedback unit 350 is designed in such a way that it is coupled with the hand sensor 115 and that it can receive the hand signal 155 from the hand sensor 115. Corresponding with information regarding a movement and/or condition of the hand 125 or parts 140 of the hand 125 included in the hand signal 155, the feedback unit 350 can output an optic signal, such as a flashing light in one particular color or in different colors. Alternatively or additionally, the feedback unit 350 can output also an acoustic signal corresponding to the hand signal 155, such as a beep signal (possibly in various pitch levels, depending on the information of the hand signal 155). It is also possible that the feedback unit 350 outputs a haptic signal, such as a vibration of the wrist 130, depending on the information of the hand signal 155. By means of such a signal, the user of the arm band 100 can receive technically very simple information as to what gesture, condition or position of the hand the hand sensor 115 has recognized.

In another embodiment of the present disclosure, the feedback unit 350 and/or transmitter unit 120 can function as a receiving unit or can have a separate receiving unit 360. Such a receiving unit 360 can be designed to receive a feedback signal 365 from a feedback signal output unit 370, wherein the feedback signal output unit 370 is located outside of the arm band sensor 100. For example, the feedback signal output unit 370 can be part of the evaluation unit 165 and receive information from the evaluation unit 165 as to which hand signal 155 or which information regarding the condition and/or position and/or movement and/or gesture of the hand 125 has been recognized by the hand sensor 115 and was transmitted by the transmitter unit 120. In this way it can be ensured that the user of the arm band sensor 100 can receive from the feedback unit 350 also an acoustic, optic and/or haptic signal, depending on what information regarding the condition, movement and/or position of the hand has been recognized by the hand sensor 115. In this way, it is possible to signal to the user of the arm band sensor 100 transmission or interpretation errors following the signal transmission between the transmitter unit and the evaluation unit 165.

According to a different embodiment of the present disclosure, the hand sensor can be designed to provide an interpretation of the movement, condition, position or gesture of the hand in a respective hand signal 155 only when the user has performed an activation gesture with the hand 125. For example, such an activation gesture can involve the forming of a fist. Therefore, the hand sensor 115 can be in an inactive condition most of the time and perform an interpretation of the movements of the hand 125 only when the user has performed such an activation. This increases considerably the user comfort, because automatic gestures supporting a conversation between the user of the arm band sensor 100 and a passenger cannot be interpreted as activation commands for an element of the vehicle.

In this respect, the approach of the present disclosure allows an interaction to be performed only after a starting command in the form of an activation gesture has been recognized. In addition, by means of the feedback unit 350, a feedback can occur after an interaction of the user of the arm band sensor 100 or a position contingent interaction can occur only when the user moves his hand with the arm band sensor in the evaluation range or "command range" 345.

By defining a starting command or starting interaction, it is possible to avoid an unintentional interaction (for example, in the "command range" 345). For example, this interaction should be performed over a specified period until a further shifting of the transmission speed levels is possible. For example, the driver could perform the gesture 230 shown in FIG. 2 for 3 seconds until the hand sensor 115 authorizes a release or an interpretation of the further hand movement. This method is comparable to the shift lock in customary automatic gearshifts.

Regarding the feedback following a successful interaction, it should be noted that a feedback is provided after performing the gestures, for example, for "release"/"park" and after the system 165 or 115 successfully recognized and interpreted the interaction. This feedback is noticed or recognized, for example, by means of a vibration of the arm band (i.e., a vibrator of the feedback unit) on the wrist 130. On the one hand, this ensures that the "park" level has been reliably set and, on the other hand, the driver has received information that the release has taken place. Depending on the interaction, this is represented by different vibration levels. For example, the parking position can be signaled in the form of a long vibration, whereas the release position (i.e., reaching the neutral mode of the transmission) can be signaled, for example, by a short vibration.

According to a further embodiment, it is also possible to provide a display unit 380, which is coupled with the evaluation unit 165 or which forms part of the evaluation unit 165. For example, the display unit 380 can be placed in the visual range of the user of the arm band sensor 100, for example, in the center console 345 on the dashboard of the vehicle, wherein the display unit 380 shows a signal in response to information of the hand signal 155 or the respectively transmitted hand signal 160 received in the evaluation unit 165. For example, the display unit 380 can output again an optical signal by switching on different lights, which respectively signal the position of gearing "D", "N", "P" and/or "R". Alternatively or additionally, it is also possible that an acoustic signal is output by the display unit 380 in order to indicate the respective information of the hand signal 155 received by the evaluation unit 165. It is also possible that the user of the arm band sensor receives a haptic signal from the display unit 380, for example, in the form of a vibration on the steering wheel 385 of the vehicle. As a result, the driver is able to view the actual transmission speed level via the display element 380 (which is designed in the form of a head up display projection, display and/or symbol illumination).

Optionally, the arm band or arm band sensor 100 can be used as a vehicle key. For example, the arm band could transmit two different frequencies for recognizing the position. One frequency for recognizing whether the driver is approaching the vehicle or whether he is in the vehicle (→Keyless-Go) and one frequency for the "command area" described above. Furthermore, the arm band 110 could be used as elements of the vehicle 335 for further control systems, such as the air-conditioning system, radio, lock, etc.

In conclusion, it should be noted that the approach of the present disclosure allows for a contact-free transmission speed level selection, which represents a completely new type of control of speed levels of vehicles with automatic transmission.

Figure 4:
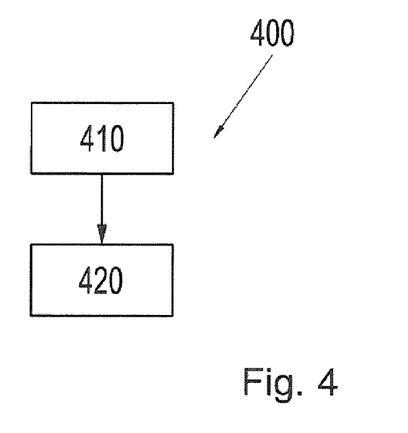
FIG. 4 a flow diagram of an embodiment of the present disclosure used as a method for operating an arm band sensor.

FIG. 4 shows a flow diagram of an embodiment of the present disclosure as a method 400 for operating an arm band sensor according to a version of the present disclosure. The method 400 comprises a step 410 for acquiring the condition and/or position of the hand in relation to the arm in order to provide the hand signal. Furthermore, the method 400 comprises a step for transmitting the hand signal, especially in wireless fashion in order to operate the arm band sensor.

Figure 5:
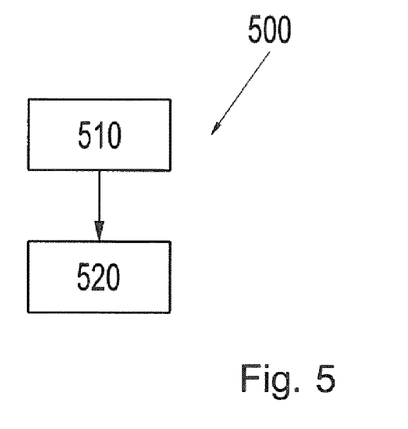
FIG. 5 a flow diagram of an embodiment of the present disclosure used as a method for operating an evaluation unit.

FIG. 5 shows a flow diagram of an embodiment of the present disclosure as a method 500 for operating an evaluation unit according to a version of the present disclosure. The method 500 comprises a step 510 of receiving the hand signal from the arm band sensor and a step 520 of activating the element of the vehicle, in particular the transmission, in response to the hand signal received from the transmitter unit of the arm band sensor.

The embodiments described and shown in the figures have been selected merely as examples. Different embodiments can be completely combined with one another or with regard to individual features. It is also possible to supplement an embodiment with features of a further embodiment.

Furthermore, the procedural steps of the present disclosure can be repeated and performed in a sequence that differs from the one described.

If an embodiment comprises an "and/or" connection between a first feature and a second feature, this means that the embodiment can involve a design that has both the first feature and the second feature, but according to a different embodiment, it can be designed to have only the first feature or only the second feature.

REFERENCE NUMERALS 100 arm band sensor
110 arm band
115 hand sensor
120 transmitter unit
125 hand
130 wrist
135 arm
140 finger, part of the hand 145 muscles
150 tendons
155 hand signal
160 transmitted hand signal
165 evaluation unit
170 transmission control unit
175 vehicle transmission
210 gesture for setting a forward travel position of the vehicle transmission
220 gesture for setting a reverse position of the vehicle transmission
230 gesture for setting a neutral position of the vehicle transmission
240 gesture for setting a parking position of the vehicle transmission
310 locating unit
320 locating signal
330 reference unit
335 vehicle
340 evaluation range, command-range
345 center console of the vehicle
350 feedback unit
360 receiving unit
365 feedback signal
370 feedback signal output unit
380 display unit
400 method for operating an arm band sensor
410 step of acquiring
420 step of transmitting
500 method for operating an evaluation unit
510 step of receiving
520 step of operating

We claim:

1. An arm band sensor comprising:
an arm band with a hand sensor, a transmitter unit, and a locating unit,
wherein the hand sensor is configured to acquire a condition and/or a position of a hand in relation to an arm in order to provide a hand signal, and
wherein the transmitter unit is configured to transmit the hand signal in wireless fashion,
wherein the locating unit is configured to receive a locating signal representing a position of the locating unit in relation to a reference unit,
wherein the hand sensor is configured to acquire the condition and/or the position of the hand in response to the locating signal, and
wherein the transmitter unit is configured to transmit the hand signal in response to the received locating signal.

2. The arm band sensor of claim 1, wherein the hand sensor is a current sensor and/or a tension sensor configured to acquire a muscle current and/or a muscle tension of the hand and/or arm, and wherein the hand sensor is configured to provide the hand signal in response to the acquired muscle current and/or the acquired muscle tension.

3. The arm band sensor of claim 1, wherein the hand sensor is a pressure sensor and/or a motion sensor configured to acquire a movement, a condition, and/or a change of a condition of the hand, and wherein the hand sensor is configured to provide the hand signal in response to the acquired movement, condition, and/or change of the condition of the hand.

4. The arm band sensor of claim 1, wherein the hand sensor is configured to distinguish a first gesture performed by the hand from a second gesture performed by the hand, and wherein the hand sensor is configured to provide information about the first gesture and/or the second gesture in the hand signal.

5. The arm band sensor of claim 1, wherein the transmitter unit is configured to transmit the hand signal only when the locating unit is located in a predetermined command range.

6. The arm band sensor of claim 1, wherein the hand sensor is configured to provide the hand signal after an activation gesture of the hand is recognized, wherein the activation gesture is different than a gesture defining the condition and/or the position of the hand determining the hand signal.

7. The arm band sensor of claim 1, further comprising a feedback unit, wherein the feedback unit is configured to output a haptic, optic, and/or acoustic user signal for the user of the arm band sensor in response to the hand signal being received.

8. The arm band sensor of claim 7, wherein the feedback unit is configured to output a second haptic, optic, and/or acoustic user signal in response to a second hand signal being received.

9. A method for operating an arm band sensor of claim 1, the method comprising:
acquiring the condition and/or the position of the hand in relation to the arm to provide the hand signal; and
transmitting the hand signal in a wireless fashion.

10. The arm band sensor of claim 1, wherein the hand sensor is an optic sensor configured to acquire a movement, a condition, and/or a change of a condition of the hand and to provide the hand signal in response to the acquired movement, condition and/or change of the condition of the hand.

11. The arm band sensor of claim 1, wherein the transmitter unit is configured to transmit the hand signal when an activation gesture of the hand is recognized.

12. An evaluation unit comprising at least one reference unit, wherein the evaluation unit is configured for evaluating a hand signal provided by an arm band sensor having:
an arm band with a hand sensor and a transmitter unit,
wherein the hand sensor is configured to acquire a condition and/or a position of the hand in relation to an arm in order to provide a hand signal,
wherein the transmitter unit is configured to transmit the hand signal in wireless fashion,
wherein the evaluation unit is configured to activate a transmission of a vehicle in response to the evaluation unit receiving a hand signal from the transmitter unit of the arm band sensor,
wherein the at least one reference unit is configured to transmit at least one locating signal, and
wherein the locating signal is configured to determine a position of a locating unit of the arm band with respect to the at least one reference unit.

13. The evaluation unit of claim 12, wherein the transmission of the vehicle is activated only when the locating signal indicates that the locating unit is located in a predetermined command range.

14. The evaluation unit of claim 12, further comprising a display unit configured to output an optic, acoustic, and/or haptic display signal corresponding to the received hand signal.

15. The evaluation unit of claim 12, further comprising a feedback signal output unit configured to output a feedback signal corresponding to the received hand signal.

16. A method for operating an evaluation unit of claim 12, the method comprising:
receiving a hand signal from the arm band sensor; and activating the transmission, in response to the hand signal being received from the arm band sensor.

17. The evaluation unit of claim 12, wherein the transmission of the vehicle is activated only after an activation gesture is recognized by the hand sensor.

18. The evaluation unit of claim 17, wherein the activation gesture is different than a hand gesture determining the hand signal.

\* \* \* \* \*